(12) United States Patent
Umemoto et al.

(10) Patent No.: US 8,597,550 B2
(45) Date of Patent: Dec. 3, 2013

(54) METHOD FOR PRODUCING WATER-RESISTANT POLARIZING FILM

(75) Inventors: Toru Umemoto, Ibarakai (JP); Junzo Miyazaki, Ibaraki (JP); Shoichi Matsuda, Ibaraki (JP); Sadahiro Nakanishi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 286 days.

(21) Appl. No.: 12/999,763

(22) PCT Filed: Feb. 4, 2009

(86) PCT No.: PCT/JP2009/051836
§ 371 (c)(1),
(2), (4) Date: Dec. 17, 2010

(87) PCT Pub. No.: WO2009/154010
PCT Pub. Date: Dec. 23, 2009

(65) Prior Publication Data
US 2011/0097483 A1    Apr. 28, 2011

(30) Foreign Application Priority Data

Jun. 20, 2008 (JP) ................................. 2008-161200
Oct. 9, 2008 (JP) ................................. 2008-262337

(51) Int. Cl.
*F21V 9/14* (2006.01)
*G02B 5/30* (2006.01)
*G02C 7/12* (2006.01)
*B05D 5/06* (2006.01)
*G02B 6/02* (2006.01)

(52) U.S. Cl.
USPC ...... 252/585; 106/287.26; 252/586; 252/587; 349/75; 359/350; 359/885; 427/163.2; 428/1.3; 428/212; 430/7; 430/270.1

(58) Field of Classification Search
USPC ..................... 106/287.26; 252/585, 586, 587; 264/1.35; 359/350, 885; 427/163.1, 427/163.2; 428/1.3, 212; 430/7, 270.1; 534/577, 832; 349/75
See application file for complete search history.

(56) References Cited

U.S. PATENT DOCUMENTS

| | | | |
|---|---|---|---|
| 7,258,924 B2 * | 8/2007 | Cott et al. ................. | 428/420 |
| 2007/0106962 A1 | 5/2007 | Sakakibara et al. | |
| 2009/0040609 A1 | 2/2009 | Hasegawa et al. | |
| 2009/0275742 A1 | 11/2009 | Sano et al. | |
| 2010/0257678 A1 | 10/2010 | Sadamitsu et al. | |

FOREIGN PATENT DOCUMENTS

| | | | | |
|---|---|---|---|---|
| JP | 11-021538 A | | 1/1999 | |
| JP | 2003-181989 | * | 7/2003 | ............. B32B 27/00 |
| JP | 2003-181989 A | | 7/2003 | |
| JP | 2004-322569 A | | 11/2004 | |
| JP | 2004-333788 A | | 11/2004 | |
| JP | 2004-347989 A | | 12/2004 | |
| JP | 2005-135145 A | | 5/2005 | |
| JP | 2006-323377 A | | 11/2006 | |
| JP | 2007-061755 A | | 3/2007 | |
| JP | 2007-126628 A | | 5/2007 | |
| JP | 2007-241269 | * | 9/2007 | ............. G02B 5/30 |
| JP | 2007-241269 A | | 9/2007 | |
| JP | 2007-290390 A | | 11/2007 | |
| JP | 2007-307885 A | | 11/2007 | |
| JP | 2007-332505 A | | 12/2007 | |
| JP | 2008-246739 A | | 10/2008 | |
| JP | 2009-93983 A | | 4/2009 | |
| WO | 2007/148757 A1 | | 12/2007 | |

OTHER PUBLICATIONS

International Search Report of PCT/JP2009/051836, mailing date of May 19, 2009.
Japanese Office Action dated Oct. 5, 2012, issued in corresponding Japanese Patent Application No. 2008-262337, (3 pages).
Japanese Office Action dated Dec. 14, 2012, issued in corresponding Japanese Patent Application No. 2008-262337 (3 pages).

* cited by examiner

*Primary Examiner* — Bijan Ahvazi
(74) *Attorney, Agent, or Firm* — Westerman, Hattori, Daniels & Adrian, LLP

(57) ABSTRACT

There is provided a method for producing a polarizing film having far superior water resistance to conventional polarizing films by contacting a liquid containing cationic polymers with a surface of a polarizing film.

2 Claims, No Drawings

METHOD FOR PRODUCING WATER-RESISTANT POLARIZING FILM

BACKGROUND OF THE INVENTION

1. Field of the Invention

The present invention relates to a method for producing a water-resistant polarizing film in which organic dyes are oriented.

2. Description of the Related Art

A method for producing a water-resistant organic thin film by applying a solution including a multivalent metal salt or an amino compound salt (a compound having two amino groups or more in a molecular) onto an organic thin film including an organic dye (dye) containing a sulfonic acid group is well known (for example, Japanese Patent Application Laid-Open Publication No. JP 11-21538 A). The solution including an amino compound salt has lower toxicity than a solution including a multivalent metal salt and is easy to use. The water resistance of an organic thin film obtained by the use of an amino compound salt was, however, far lower than the one using a multivalent metal salt, which did not meet requirements for the applications of a polarizing film.

SUMMARY OF THE INVENTION

Conventionally, the water resistance of organic thin films obtained by the use of an amino compound salt did not meet requirements for the applications of polarizing films. It is an object of the present invention to provide a method for producing a water-resistant polarizing film so as to meet requirements for the applications of a polarizing film by improving water resistance of an organic thin film obtained by the use of an amino compound salt.

Inventors of the present invention carried out extensive investigations to improve water resistance of a polarizing film including an organic dye containing an anionic group. As a result, they have found out that it is possible to obtain a polarizing film having far superior water resistance to conventional polarizing films (water-resistant polarizing films) by contacting a liquid containing cationic polymers with a surface of the aforementioned polarizing film.

It is presumed that the reason why the water-resistance of the polarizing film is improved by the production method according to the present invention is that cationic polymers enter inside the polarizing film so that cationic polymers are electrostatically connected to an organic dye having an anionic group, which leads to immobilization.

The summary of the present invention is described as follows:

In a first preferred embodiment, a method for producing a water-resistant polarizing film according to the present invention includes a step of contacting a liquid containing cationic polymers with a surface of a polarizing film including an organic dye containing an anionic group.

In a second preferred embodiment of the method for producing a water-resistant polarizing film according to the present invention, the anionic group is any one of a sulfonic acid group, a carboxyl group, a phosphate group, and a base thereof.

In a third preferred embodiment of the method for producing a water-resistant polarizing film according to the present invention, the cationic polymers are polymers containing an amino group or heterocyclic polymers including a nitrogen atom.

In a fourth preferred embodiment of the method for producing a water-resistant polarizing film according to the present invention, the cationic polymers are any one of diallyamine hydrochloride polymers, diallylamine hydrochloride-maleic acid copolymers, allylamine amide sulfate polymers, and allylamine hydrochloride polymers.

ADVANTAGE OF THE INVENTION

It is possible to obtain a polarizing film which is far superior in water resistance to conventional polarizing films by contacting a liquid containing cationic polymers with a surface of a polarizing film including an organic dye containing an anionic group.

DESCRIPTION OF THE PREFERRED EMBODIMENTS

[Method for Producing Water-Resistant Polarizing Film]

A method for producing a water-resistant polarizing film of the present invention includes a step of contacting a liquid containing cationic polymers with a surface of a polarizing film including an organic dye containing an anionic group. The method for producing a water-resistant polarizing film of the present invention is not particularly limited, but may include other steps as long as the method includes the aforementioned step.

Examples of the other steps typically include a step of washing the surface of the polarizing film after contacting the liquid containing cationic polymers with the surface of the polarizing film to remove the liquid containing extra cationic polymers adhered to the surface of the polarizing film or a step of drying the surface of the polarizing film after contacting the liquid containing cationic polymers with the surface of the polarizing film.

[Polarizing Film before Water-Resistant Treatment]

The polarizing film before water-resistant treatment to be used in the present invention includes an organic dye containing an anionic group. The content of the organic dye including an anionic group is preferably 80% by weight to 100% by weight, more preferably 90% by weight to 100% by weight relative to the total weight of the polarizing film.

The polarizing film before water-resistant treatment to be used in the present invention is not particularly limited as long as the polarizing film includes an organic dye containing an anionic group and may include any other organic dyes and additives. Examples of such an additive include a surfactant, an antioxidant, an antistatic agent, an ultraviolet absorber, and an antibacterial agent or the like.

As described in Japanese Patent Application Laid-on Publication No. 2007-61755 A, it is possible to obtain the polarizing film before water-resistant treatment to be used in the present invention by casting by flow a coating liquid containing an organic dye having an anionic group and a solvent and then orienting the organic dye.

[Organic Dye Containing Anionic Group]

The organic dye containing an anionic group has an anionic group in the molecule of a dye. Examples of an anionic group include a sulfonic acid group, a carboxyl group, a phosphate group, and a base thereof or the like. The number (substituted number) of anionic groups contained in the organic dye is preferably 2 to 4. Such an organic dye acts as a substituent group to provide solubility in a hydrophilic solvent before contacting a liquid containing cationic polymers (before water-resistant treatment), so that it is easy to prepare a coating liquid. On the other hand, a superior water-resistant polarizing film is obtained because the anionic group acts as a cross-linking point between the cationic polymers after contacting the liquid containing cationic polymers (after water-resistant treatment).

An organic dye described in Japanese Patent Application Laid-Open Publication Nos. JP 2007-126628 A and JP 2006-323377 A may be used as an organic dye including an anionic group to be used in the present invention. Such an organic dye listed in these publications exhibits liquid crystallinity in a solution state and may be oriented by a flow when applying shearing force in a liquid crystal state.

Since the aforementioned organic dye forms supramolecular aggregates in solution, the longitudinal direction of the supramolecular aggregates is oriented in a flow direction when flowing the organic dye by applying shearing force to the solution including these supramolecular aggregates.

An azo compound represented by the following general formula (1) is preferably used as the aforementioned organic dye, and an azo compound represented by the following general formula (2) is more preferably used as the aforementioned organic dye. Such an azo compound exhibits a stable liquid crystal phase (lyotropic liquid crystallinity) in a state of being dissolved in the solvent and is excel in orientation. Further, in the aforementioned azo compound, steric hindrance among —$SO_3M$ groups becomes smaller by positioning the —$SO_3M$ groups at a specific location and the linearity of molecules before and after water-resistant treatment is maintained. As a result, a polarizing film with a high polarization degree is obtained.

[Chemical formula 1]

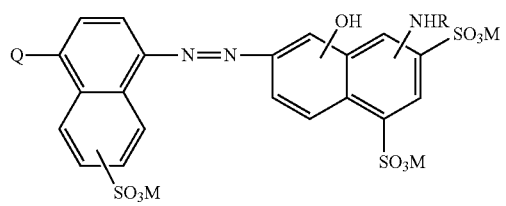

(1)

[Chemical formula 2]

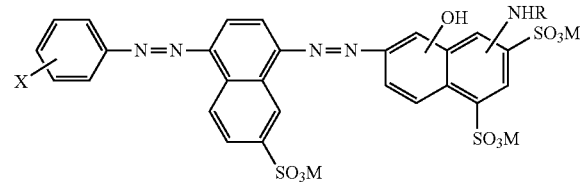

(2)

In the aforementioned general formula (1), Q is a substituted or unsubstituted phenyl group or a substituted or unsubstituted naphthyl group. In the aforementioned general formulae (1) and (2), R is a hydrogen atom, an alkyl group having 1 to 3 carbon numbers, an acetyl group, a substituted or unsubstituted benzoyl group, or a substituted or unsubstituted phenyl group. In the general formula (2), X is a hydrogen atom, a halogen atom, a nitro group, a cyano croup, an alkyl group having 1 to 4 carbon numbers, an alkoxy group having 1 to 4 carbon numbers, or a —$SO_3M$ group.

In the aforementioned general formulae (1) and (2), M represents any one of a hydrogen atom, an alkaline metal atom, an alkaline-earth metal atom before contacting a liquid containing cationic polymers with a surface of the polarizing film. After contacting the liquid containing cationic polymers with the surface of the polarizing film, M represents partially or wholly cationic species of cationic polymers.

It is possible to obtain the azo compound represented by the general formulae (1) and (2) by diazotizing and coupling an aniline derivative and a naphthalene sulfonate derivative in accordance with a conventional method and the obtained monoazo compound is subject to diazotization and coupling reaction with an amino naphthol disulfonic acid derivative.

[Liquid Containing Cationic Polymers]

The liquid containing cationic polymers to be used in the present invention is prepared by dissolving or dispersing cationic polymers in any solvent. The aforementioned cationic polymer is a compound having at least some hundreds of molecular weight having a cationic group on a main chain or a side chain.

The aforementioned cationic polymers may be either linear or branch-like or cross-linking-like. The molecular weight of the cationic polymers is preferably 300 or more, more preferably 1,000 to 1,000,000.

The aforementioned cationic group is not particularly limited, but examples thereof typically include an amino group, an imino group, an ammonium group and a group having a nitrogen atom partially included in a ring.

Examples of the aforementioned cationic polymers typically include polyallylamine, polydiallylamine, polyethyleneimine, dicyan diamide polyalkylenepolyamine, a condensate of dialkylamine and epichrorohydrin, polyvinyl amine, polyvinyl pylidine, polyvinyl imidazole, and a condensate of diallyldimethyl ammonium salt. In the present invention, the aforementioned cationic polymers may be used as one kind or may be used in combination of two kinds of cationic polymers or more. Alternatively, the aforementioned cationic polymers may be mixed with a multivalent metal salt, such an alkaline-earth metal atom or the like.

The aforementioned cationic polymers are preferably polymers with an amino group or heterocyclic polymers with a nitrogen atom, more preferably diallylamine hydrochloride polymers represented by the following structural formula (4), diallylamine hydrochloride-maleic acid copolymers represented by the following structural formula (5) or allylamine amide sulfate polymers represented by the following structural formula (6):

[Chemical formula 4]

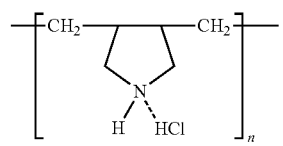

(4)

[Chemical formula 5]

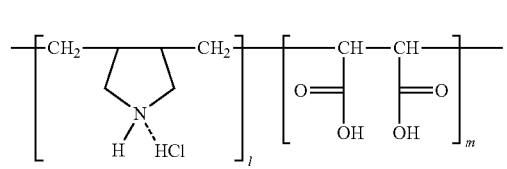

(5)

[Chemical formula 6]

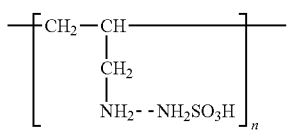

Solvents to dissolve or disperse cationic polymers to be used in the present invention are preferably hydrophilic solvents. Water, alcohol kinds, cellosolve kinds and mixture thereof are preferably used as the hydrophilic solvents.

The liquid containing cationic polymers to be used in the present invention preferably has a cationic polymer concentration of 10% by weight to 50% by weight, more preferably has a cationic polymer concentration of 20% by weight to 30% by weight relative to the total weight of the liquid.

The means for contacting a liquid containing cationic polymers with a surface of a polarizing film including an organic dye having an anionic group to be used in the present invention is not particularly limited, but may be applying a liquid containing cationic polymers onto a surface of the polarizing film, alternatively, may be immersing the polarizing film in the liquid containing cationic polymers.

[Polarizing Film after Water-Resistant Treatment (Water-Resistant Polarizing Film)]

In the producing method of the present invention, it is possible to obtain a water-resistant polarizing film by contacting a liquid containing cationic polymers with a surface of a polarizing film including an organic dye containing an anionic group. In the case where the polarizing film obtained according to the present invention comprises an azo compound represented by the aforementioned general formula (1) or (2), M (monovalent cation) in the formula is partially or wholly substituted for cationic species of cationic polymers.

The aforementioned water-resistant polarizing film of the present invention exhibits absorption dichroism at least at one wavelength in a visible light region (at a wavelength of 380 to 780 nm). The polarization degree of the aforementioned water-resistant polarizing film obtained by Y value whose visibility has been corrected is 95% or higher.

The thickness of the aforementioned water-resistant polarizing film is not particularly limited, but is preferably 0.1 to 10 µm. When the water-resistant polarizing film has a thickness of less than 1 µm, the water-resistant polarizing film may be formed on a support to secure self-reliance.

[Applications of Water-Resistant Polarizing Film]

The water-resistant polarizing film obtained by the producing method of the present invention is preferably used as a polarizing element. The polarizing element is applied to liquid crystal display apparatuses, such as liquid crystal television units, computer displays, cell phones, digital cameras, Personal Digital Assistance (PDA), portable game devices, video cameras, and car navigation system or the like.

EXAMPLES

Example 1

In accordance with a conventional method ("Riron Seizo Senryo Kagaku" Fifth Edition (Theoretical production Dye Chemistry), Yutaka Hosoda (published on Jul. 15, 1968, GIHODO SHUPPAN Co., Ltd.), pages 135 to 152), a monoazo compound was produced by diazotizing and coupling 4-nitroaniline and 8-amino-2-naphthalene sulfonic acid. The obtained monoazo compound was diazotized by a conventional method in the same manner and was further subject to diazotization and coupling reaction with 1-amino-8-naphthol-2,4-disulfonate lithium salt to obtain a crude product and salting out was carried out with lithium chloride to obtain an azo compound having the following structural formula (3):

[Chemical formula 3]

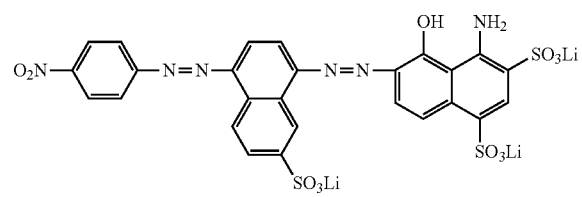

The azo compound of the aforementioned structural formula (3) was dissolved in ion-exchange water to prepare a coating solution having an azo compound concentration of 20% by weight. The coating liquid had a pH of 7.8. The coating solution was obtained with a polyethylene dropper and was sandwiched by two pieces of slide glasses. A nematic liquid crystal phase was observed when observing with a polarization microscope at room temperature (23° C.).

The coating solution was applied onto a surface of a norbornene polymer film (produced by Nippon Zeon Co., Ltd., product name "Zeonor") with rubbing treatment and corona treatment using a bar coater (produced by BUSCHMAN, product name "Mayerrot HS4") to obtain a laminate composed of a polarizing film and a norbornene polymer film by natural drying in a temperature-controlled room at 23° C. The polarizing film had a thickness of 0.4 µm.

The laminate composed of the aforementioned polarizing film and the norbornene polymer film was immersed in water containing 25% by weight of diallyamine hydrochloride polymers (manufactured by Nitto Boseki Co., Ltd., Product name: "PAS-21CL", average molecular weight: 110,000) for 30 minutes and subsequently, was dried after washing the surface of the polarizing film with water. Ion distribution of the thus obtained water-resistant polarizing film was profiled by TOF-SIMS. As a result, diallylamine hydrochloride polymers-derived ions ($C_4H_6N^+$) were uniformly distributed in the aforementioned water-resistant polarizing film. On the other hand, lithium ions ($Li^+$) were not detected. Therefore, it was confirmed that lithium ions were substituted by diallylamine hydrochloride polymers-derived ions in the water-resistant polarizing film. Table 1 shows evaluation results of optical characteristics and water-resistant tests of the thus obtained water-resistant polarizing film.

Example 2

A water-resistant polarizing film was prepared in the same manner as in Example 1 except for using diallylamine hydrochloride-maleic acid copolymers (produced by Nitto Boseki Co., Ltd., product name: "PAS-410") as a substitute for diallylamine hydrochloride polymers. Table 1 shows evaluation results of optical characteristics and water-resistant tests of the obtained water-resistant polarizing film.

Example 3

A water-resistant polarizing film was prepared in the same manner as in Example 1 except for using allylamine amide sulfate polymers (produced by Nitto Boseki Co., Ltd., product name: "PAA-SA") as a substitute for diallyamine hydrochloride polymers. Table 1 shows evaluation results of optical characteristics and water-resistant tests of the obtained water-resistant polarizing film.

Example 4

A water-resistant polarizing film was prepared in the same manner as in Example 1 except for using allylamine hydrochloride polymers (produced by Nitto Boseki Co., Ltd., product name: "PAA-HCL-3L") as a substitute for diallylamine hydrochloride polymers. Table 1 shows evaluation results of optical characteristics and water-resistant tests of the obtained water-resistant polarizing film.

Comparative Example 1

A water-resistant polarizing film was prepared in the same manner as in Example 1 except for using barium chloride as a substitute for diallylamine hydrochloride polymers. Table 1 shows evaluation results of optical characteristics and water-resistant tests of the obtained water-resistant polarizing film.

Comparative Example 2

A water-resistant polarizing film was prepared in the same manner as in Example 1 except for using triethylamine (molecular weight 101) as a substitute for diallylamine hydrochloride polymers. Table 1 shows evaluation results of optical characteristics and water-resistant tests of the obtained water-resistant polarizing film.

Comparative Example 3

Table 1 shows evaluation results of optical characteristics and water-resistant tests of a polarizing film before performing water-resistant treatment with a liquid containing diallyamine hydrochloride polymers in Example 1.

TABLE 1

|  | Water-resistant treatment agent | Rate of dissolution (%) | Residual ratio (%) |
|---|---|---|---|
| Example 1 | PAS-21CL | 1.9 | 98.1 |
| Example 2 | PAS-410 | 2.8 | 97.2 |
| Example 3 | PAA-SA | 2.7 | 97.3 |
| Example 4 | PAA-HCL-3L | 2.6 | 97.4 |
| Comparative Example 1 | Barium chloride | 15.1 | 84.9 |
| Comparative Example 2 | Triethylamine | 100 | 0 |
| Comparative Example 3 | Nothing | 100 | 0 |

[Evaluation]

(1) Water-resistant treatment performed by diallylamine hydrochloride polymers PAS-21CL is the most effective.

(2) The effects of water-resistant treatment performed by diallylamine hydrochloride-maleic acid copolymers PAS-410, allylamine amide sulfate polymers PAA-SA, allylamine hydrochloride polymers PAA-HCL-3CL are virtually equal.

(3) Water-resistant treatment performed by barium chloride is rather low.

(4) Water-resistant treatment performed by triethylamine has no effect.

[Measuring Method]
[Measurement of Thickness]

A portion of a polarizing film was released to obtain the thickness of the polarizing film by measuring the level difference using a three-dimensional measurement system of the shape of a non-contact surface (manufactured by Ryoka Systems, Inc., product name: "Micromap MM5200").

[Observation of Liquid Crystal Phase]

The coating solution was sandwiched by two pieces of slide glasses to observe using a polarization microscope (manufactured by Olympus, product name: "OPTIPHOT-POL") with a large-size sample heating and cooling stage (manufactured by Japan High Tech Co., Ltd., product name "10013L").

[Measurement of Residual Ratio and Rate of Dissolution]

A laminate (dimensions 1 cm×2 cm) composed of a water-resistant treated polarizing film and a substrate was immersed in 100 ml of water contained in a plastic cup and was allowed to stand for 3 hours. Subsequently, stirring was carried out to make water uniform to measure absorbance of a water wavelength of 594 nm using a spectroscope (manufactured by VARIAN, Inc., product name: "CARY500i"). The residual ratio and rate of dissolution were obtained by the thus obtained absorbance from the following equation:

$$\text{Rate of dissolution}(\%) = (A_1/A_0) \times 100$$

$$\text{Residual ratio}(\%) = 100 - \text{rate of dissolution}$$

wherein $A_1$ is absorbance of water after being allowed to stand for 3 hours and $A_0$ is absorbance of water in which the polarizing film has been completely dissolved.

[Measurement of Ion Distribution of Water-Resistant Polarizing Film]

A water-resistant polarizing film was obliquely machined by a precision cutter (manufactured by MEKONG COMPANY) to analyze a cutting surface using a TOF-SIMS ("TOF-SIMS5" manufactured by ION-TOF CORPORATION). Conditions were primary ion accelerating voltage=25 kv.

What is claimed is:

1. A method for producing a water-resistant polarizing film comprising a step of water-resistant treatment to contact a liquid containing a cationic polymer and a hydrophilic solvent with a surface of a polarizing film including an organic dye containing an anionic group to cause the cationic polymer to penetrate inside the polarizing film, and
   wherein the cationic polymer is at least one selected from the group consisting of diallyamine hydrochloride polymers, diallyamine hydrochloride-maleic acid copolymers, allylamine amide sulfate polymers, and allylamine hydrochloride polymers.

2. The method according to claim 1, wherein the anionic group is at least one anionic group selected from the group consisting of a sulfonic acid group, a carboxyl group, a phosphate group, and a base thereof.

* * * * *